(No Model.)

J. W. BIRKETT.
RECEIVER FOR DISINFECTANTS.

No. 263,841. Patented Sept. 5, 1882.

WITNESSES:
Clinton Brown,
Joseph McCrane

INVENTOR:
James W. Birkett,
BY E. R. Brown,
ATTORNEY.

UNITED STATES PATENT OFFICE.

JAMES W. BIRKETT, OF BROOKLYN, NEW YORK.

RECEIVER FOR DISINFECTANTS.

SPECIFICATION forming part of Letters Patent No. 263,841, dated September 5, 1882.

Application filed May 11, 1882. (No model.)

*To all whom it may concern:*

Be it known that I, JAMES W. BIRKETT, of Brooklyn, in the county of Kings and State of New York, have invented a new and useful Receiver for Disinfectants; and I hereby declare that the following is a full, clear, and exact description of the same.

My invention relates to an apparatus to be attached to a soil-pipe, or a waste-pipe leading from a basin, sink, bath-tub, or any other source to a pipe connecting with a sewer, and adapted to hold a quantity of carbolic acid or other volatile disinfectant for the purpose of counteracting the effect of any sewer-gas or deleterious vapor which might exist in said pipe or arise therein.

The invention consists essentially in a vessel for holding volatile disinfecting substance, a perforated cover for the same, and a casing inclosing said vessel and cover, together with certain details of construction and arrangement of parts, whereby provision is made for attaching the apparatus to a pipe of any description, for supplying the vessel with disinfectant, and for allowing the fumes therefrom to pass into the pipe and destroy the gas or vapor existing or arising therein.

The accompanying drawings represent an apparatus embodying my improvements.

Figure 1:
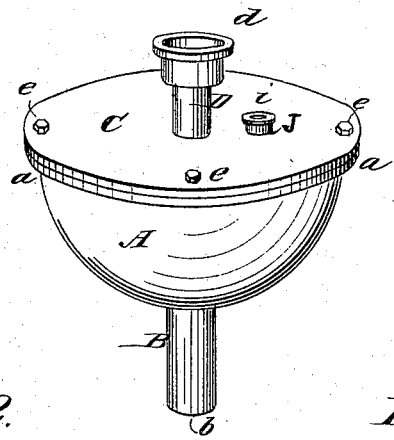
Figure 2:
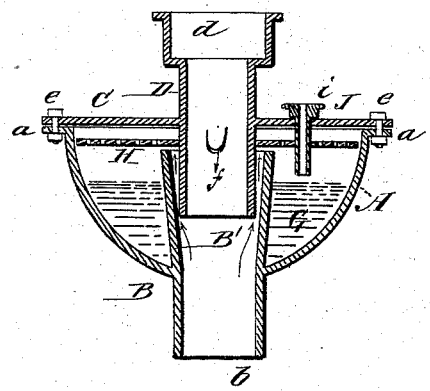
Figure 3:
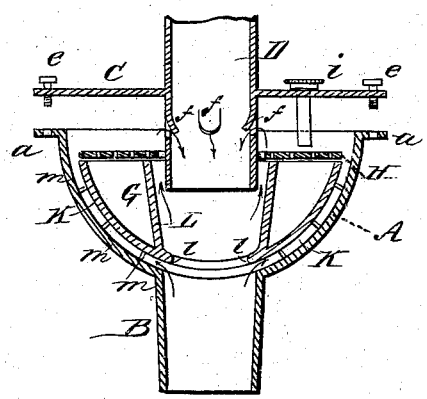

Figure 1 is a perspective view of the apparatus ready to be placed in position for use. Fig. 3 is a vertical sectional view of the same. Fig. 2 is a vertical sectional view of a modification thereof.

The various parts of the apparatus may be made of cast-iron, lead, terra-cotta, composition, or any other suitable metal or material, according to their dimensions and the particular use to which the apparatus is to be applied. When it is to be applied to what is known as a "soil-pipe" it may be made of iron or terra-cotta, preferably the former; and when applied to a lead or other smaller pipe it may be made of brass or lead, or other soft metal.

Referring to Figs. 1, 2, and 3, A represents a hemispherical casing, provided with an equatorial flange, a, and having a pipe, B, extending downward from its bottom.

C is a circular plate, in size corresponding with the periphery of the flange, and having cast in one piece with it a pipe, D, which extends from its center about an equal distance both above and below its surface. The upper end of the pipe D is formed into a "bell," d, for the reception of the "spigot" of the pipe, to which it is to be applied; and the lower end of the pipe B forms a spigot, b, for insertion in the bell of the pipe to which it is to be joined. Said bell d and spigot b are made to correspond with the standard size of the pipes to which they are to be connected, and the connection is made in the usual manner in which ordinary pipes are joined. The plate C is secured to the casing A by bolts e passing through said plate and the flange a, and fastened by nuts, the joint being packed, cemented, or sealed in any suitable manner.

In the interior of the casing is formed an annular trough, G, for holding carbolic acid or other volatile disinfecting substance. On the top of this trough rests an annular perforated plate, H, through the center of which the lower end of the pipe D passes, the hole in the plate being larger than the pipe. The trough G being supplied with volatile disinfecting substance, the fumes thereof rise through the perforations in the plate H and fill the space between it and the plate C, passing thence down around the pipe D and up into said pipe, and also down through the pipe B, thus intercepting and neutralizing or destroying any sewer-gas or deleterious vapor which may exist or arise therein or in the pipes to which the apparatus is connected. The disinfecting substance is supplied to the trough G through a feed-tube, J, carried by the top plate, C, and passing through a hole in the perforated plate H, said tube being provided with a screw-cap, i.

The trough or receiver G may be formed in one piece with the casing A by extending the pipe B' upward into the interior of the casing, as shown in Fig. 2; or it may consist of a separate and distinct vessel, as shown in Fig. 3. In the latter case the trough is formed in a bowl or vessel, K, having a pipe, L, extending upward from the center to a level with the edge of the bowl, but extending downward below the exterior of the bottom only sufficiently far to form an inwardly-turned flange or rim, l. The exterior surface of the bowl or vessel K is smaller than the interior of the casing A, and is provided with a number of studs or teats, m, to hold it steadily in place in the casing. The advantage of this construction over that shown in Fig. 2 is that it causes a continuous current to circulate, as indicated by the arrows, so that any gas which may rise in the pipe is constantly intercepted by the fumes of the disinfectant rising from the trough. The pipes B and L are sufficiently larger than the pipe D to allow a free circulation between the former and the latter. In both the forms shown the pipe D is provided with a number of inwardly-turned tongues or lugs, $f$, forming openings sufficiently large to allow a circulation, as indicated by the arrows, but not large enough to allow any considerable quantity of water to pass through them into the casing when descending the pipe.

When the apparatus is to be applied to a pipe located near a wall or in a corner, where the hemispherical form would not be practicable, the casing may be formed minus a segment or minus two segments at a right angle with each other, so as to present a vertical surface parallel with said wall or corner. I do not, however, confine myself to any particular form of the casing, as it is obvious that a variety of forms might be adopted with propriety.

In the form shown in Fig. 4 the branch Q forms the casing for inclosing the receiver.

Having thus described my invention, what I claim as new, and desire to secure by Letters Patent, is—

1. A disinfecting device consisting of an annular trough for holding a disinfectant liquid, a perforated cover therefor, and a tight cover having inlet-pipe passing therethrough, substantially as described.

2. A casing consisting of a hemispherical portion, A, provided with a pipe, B, and a circular plate, C, provided with a pipe, D, substantially as and for the purpose herein described.

3. A disinfectant-holder consisting of a bowl, K, having an annular trough, G, formed by the body of said bowl, and a central pipe, L, extending upward from the bottom thereof, substantially as herein described.

4. The combination, with the top plate, C, perforated plate H, and bowl K, of the feed-tube J, provided with a cap, $i$, substantially as and for the purpose herein described.

5. The combination, with the receiver A, provided with the downwardly-extending pipe B, of the bowl K, provided with the studs or teats $m$ and flange or rim $l$, substantially as and for the purpose herein described.

6. The combination, with the trough or receiver K, of the downwardly-extending pipe D, provided with the tongues or lugs $f$, substantially as and for the purpose herein described.

JAMES W. BIRKETT.

Witnesses:
E. R. BROWN,
FRANK S. HENDERSON.